July 24, 1934.  W. MERTÉ  1,967,836
PHOTOGRAPHIC LENS
Filed Dec. 29, 1933
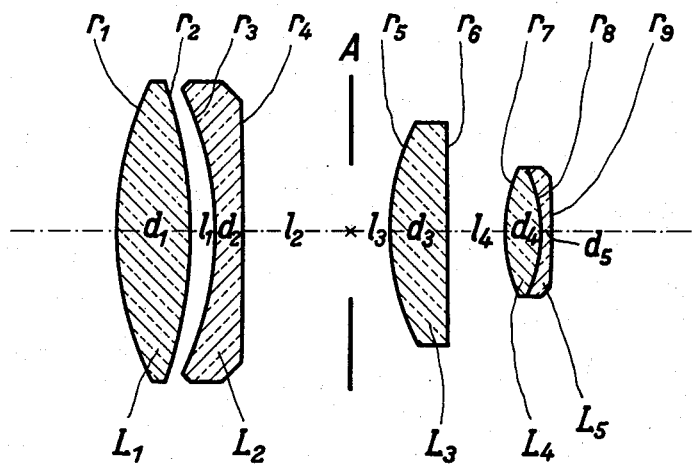
| | | | | |
|---|---|---|---|---|
| $r_1 = +\ 135,14$ | | | $d_1 = 29,98$ | |
| $r_2 = -\ 182,95$ | | | $l_1 = 9,78$ | |
| $r_3 = -\ 128,96$ | | | $d_2 = 11,70$ | |
| $r_4 = -\ 1813,8$ | | | $l_2 = 43,80$ | |
| $r_5 = +\ 97,65$ | | | $l_3 = 16,59$ | |
| $r_6 = \infty$ | | | $d_3 = 23,82$ | |
| $r_7 = +\ 60,22$ | | | $l_4 = 22,64$ | |
| $r_8 = -\ 59,78$ | | | $d_4 = 15,10$ | |
| $r_9 = -\ 369,17$ | | | $d_5 = 3,40$ | |
| | $L_1$ | $L_2$ | $L_3$ | $L_4$ | $L_5$ |
|---|---|---|---|---|---|
| $n_d =$ | 1,63753 | 1,75823 | 1,46449 | 1,62203 | 1,75823 |
| $\nu =$ | 56,1 | 27,4 | 65,8 | 53.1 | 27,4 |
Inventor:
Willy Merté

Patented July 24, 1934

1,967,836

UNITED STATES PATENT OFFICE 1,967,836

PHOTOGRAPHIC LENS

Willy Merté, Jena, Germany, assignor to the firm Carl Zeiss, Jena, Germany

Application December 29, 1933, Serial No. 704,492
In Germany December 30, 1932

5 Claims. (Cl. 88—57)

I have filed an application in Germany, December 30, 1932.

The invention concerns the manufacture of a well corrected lens for taking and reproducing photographs which has an especially great aperture.

According to the invention, a lens of this kind consists of a system of four members separated by air, the member second in place being dispersive and all the other members being convergent. This lens differs advantageously from the known lenses of this kind in that the curvature of the rear surface of each member is not as pronounced as that of the front surface, in that the air lens between the first and the second member is dispersive and represents a meniscus whose front refracting surface is concave, in that the two other air lenses are convergent, and in that the length between its vertices is greater than half its focal length. The sequence of the different members relative to each other is determined in such a manner that the designation front member concerns the member which faces the object when the photographic lens is used for reducing purposes and which faces the image when magnifications are concerned. As a matter of course, the photographic lens may be used as well as a finder objective.

The invention offers the advantage of photographic lenses of simple construction whose spherical zones do not surpass, for instance, 2°/oo at a relative aperture of 1:0.90. Evidently, the correction may be further increased by making the different members consist of two or more single lenses cemented to each other.

It is convenient to so construct the photographic lens that the length between its vertices is greater than three quarters of and smaller than twice its focal length.

It has proved to be advantageous to use glass of high dispersion for the member second in place, which is dispersive. In this case, it is most convenient to take glass whose $\nu$ value is smaller than 35. Applying a glass of this kind in a dispersive lens of a cemented converging member also influences the correction very favorably.

It is also advantageous to give the radii of curvature of the rear surfaces of the second, third and fourth members a length which is at least twice the focal length of the photographic lens.

The accompanying drawing represents schematically a constructional example of a photographic lens according to the invention. The dimensions and the kinds of glass are indicated in the table below. When the ratio of aperture is 1:0.90 and when the focal length is 100 mm., the constructional example may be used for an image field in the focal plane of a diameter of approximately 25 mm. When the demands upon the definition of image are not as high, the said lens may be used for image fields which are even larger. The dimensions in the table below are indicated in millimetres. In the constructional example, a diaphragm is assumed to be disposed at A.

| Radii | Thicknesses and distances |
|---|---|
| $r_1 = +135.14$ | $d_1 = 29.98$ |
| $r_2 = -182.95$ | $l_1 = 9.78$ |
| $r_3 = -128.96$ | $d_2 = 11.70$ |
| $r_4 = -1813.8$ | $l_2 = 43.80$ |
| $r_5 = +97.65$ | $l_3 = 16.59$ |
| $r_6 = \infty$ | $d_3 = 23.82$ |
| $r_7 = +60.22$ | $l_4 = 22.64$ |
| $r_8 = -59.78$ | $d_4 = 15.10$ |
| $r_9 = -369.17$ | $d_5 = 3.40$ |

*Kinds of glass*

| | $L_1$ | $L_2$ | $L_3$ | $L_4$ | $L_5$ |
|---|---|---|---|---|---|
| $n_d =$ | 1.63753 | 1.75823 | 1.46449 | 1.62203 | 1.75823 |
| $\nu =$ | 56.1 | 27.4 | 65.8 | 53.1 | 27.4 |

I claim:

1. A photographic lens consisting of four members separated by air, the member second in place being dispersive and all the other members being convergent, the curvature of the rear surface of each member being less pronounced than that of the front surface, the air lens first in place being dispersive and having concave refracting front surfaces, the two other air lenses being convergent, and the length between the vertices of the photographic lens being greater than half the focal length of this lens, and smaller than twice the focal length of the lens.

2. A photographic lens consisting of four members separated by air, the member second in place being dispersive and all the other members being convergent, the curvature of the rear surface of each member being less pronounced than that of the front surface, the air lens first in place being dispersive and having concave refracting front surfaces, the two other air lenses being convergent, and the length between the vertices of the photographic lens being greater than three quarters of and smaller than twice the focal length of this lens.

3. In a photographic lens according to claim 1, the second member having a glass whose $\nu$ value for the $d$-line is smaller than 35.

4. In a photographic lens according to claim 1, the last convergent member having a dispersive lens whose $\nu$ value is smaller than 35.

5. In a photographic lens according to claim 1, the radii of curvature of the rear surfaces of the second, third and fourth members being at least as long as the objective focal length.

WILLY MERTÉ.